United States Patent
Foucher et al.

(10) Patent No.: US 7,246,320 B2
(45) Date of Patent: Jul. 17, 2007

(54) PROCESS FOR OPTIMIZED NAVIGATION IN DISPLAY MENUS OF A MOBILE TERMINAL AND ASSOCIATED MOBILE TERMINAL

(75) Inventors: Albert Foucher, Versailles (FR); Michael Blanc, Paris (FR); Jean Philippe Boris, Paris (FR); Olivier Gambari, Paris (FR); Benoit Pigeon, Paris (FR); Nanné Prauda, Paris (FR)

(73) Assignee: Societte Francaise du Radiotelephone, Paris la Defense (FR)

( * ) Notice: Subject to any disclaimer, the term of this patent is extended or adjusted under 35 U.S.C. 154(b) by 653 days.

(21) Appl. No.: 10/740,984

(22) Filed: Dec. 19, 2003
(Under 37 CFR 1.47)

(65) Prior Publication Data
US 2006/0184896 A1   Aug. 17, 2006

(30) Foreign Application Priority Data
Dec. 24, 2002   (FR) .................................. 02 16667

(51) Int. Cl.
*G06F 3/00* (2006.01)
(52) U.S. Cl. ...................... 715/739; 715/810; 715/853; 715/864
(58) Field of Classification Search ................ 715/810, 715/739, 853, 864
See application file for complete search history.

(56) References Cited

U.S. PATENT DOCUMENTS

| | | | | |
|---|---|---|---|---|
| 5,594,673 | A | * 1/1997 | Coffin | 708/145 |
| 2001/0015721 | A1 | * 8/2001 | Byun et al. | 345/169 |
| 2002/0039915 | A1 | * 4/2002 | Hama et al. | 455/566 |
| 2003/0040340 | A1 | * 2/2003 | Smethers | 455/566 |

FOREIGN PATENT DOCUMENTS

EP          1104151 A2      5/2001

* cited by examiner

*Primary Examiner*—Weilun Lo
*Assistant Examiner*—TuyetLien Tran

(57) ABSTRACT

A mobile wireless communication terminal endowed with a user interface having a display means and a navigational cross. The navigational cross has functionalities complementary to the functionalities for up/down movement. The process includes displaying with the display means a selection menu of items, manipulating the navigational cross to select an item, then alternatively displaying, in response to activation of the first of the complementary functions of the navigational cross, a first batch of possible actions on the data associated with the selected item, or displaying, in response to activation of the second of the complementary functionalities of the navigational cross, a second batch of possible actions on the data associated with the item selected.

16 Claims, 4 Drawing Sheets

PROCESS FOR OPTIMIZED NAVIGATION IN DISPLAY MENUS OF A MOBILE TERMINAL AND ASSOCIATED MOBILE TERMINAL

BACKGROUND OF THE INVENTION

1. Field of the Invention

The present invention concerns the field of data management in a mobile terminal. The present invention more particularly concerns an optimization process for a management system for navigating displays in a mobile terminal for wireless communication as well as a mobile terminal for implementing this process.

2. Brief Description of Related Developments

In the following, by mobile terminal is meant any portable receiver and possibly transmitter, for example, a cellular telephone or portable communicator. The invention is more particularly designed for the optimization of interfaces between a mobile terminal and a user.

In a known manner, a mobile terminal comprises a display screen, a keyboard and/or a navigation means, as elements for interface and interaction. It also comprises software, called "drivers", managing the operation of peripherals. Numerous solutions have been proposed in order to access, store and manage data accessible from a mobile terminal interface. Thus, an improved interface providing numerous functions to the user is known from EP Patent 1,104,151. This type of interface comprises a navigational cross permitting the user to have access to and interact with applications by means of only one hand. With this type of interface a window display mode called dedicated, stackable (pop-up in English) windows is used. The interface described in this document permits classically displaying the options that can be selected by the user and listed in a "pop-up" menu in an ascending/descending list of articles, the available options being divided into different logic groups of options.

In the prior art, items accessible in a selection menu for an address book or other classical functionality are ordinarily presented in a list mode or matrix mode. The selection actions in this type of classical menu consist of validating the item selected by means of a navigational cross. After this validation, a pop-up menu providing the data/options relating to the selected item appears. After a validation of one of these data/options, a stacked window appears superimposed on the preceding screen or in a smaller-size frame. Interface systems of the prior art have the disadvantage that the different actions that can be envisioned on an item of a selection menu are only accessible after validation and therefore [with] display of the data relative to this item.

SUMMARY OF THE INVENTION

An object of the present invention is to eliminate one or more of the disadvantages of the prior art by defining an optimization process for a management system for a mobile terminal permitting accessing possible actions for a selection item without display of the corresponding data.

One of the objects of the present invention is also to render all of the possible actions accessible from one item of a selection menu, while avoiding presenting too great a number of actions in the same menu with an ascending/descending "pop-up" list, by advantageously using a navigation means for a mobile terminal so as to validate the same selected item in at least two different ways.

For this purpose, the invention concerns an optimized navigation process in display menus of a mobile wireless communication device, in which the mobile terminal is endowed with a user interface that comprises a display means and at least one integrated control means called [a] navigational cross in order to move a cursor or the like over the display means by physical actions on the cross, said navigational cross notably having two functionalities complementary to the functionalities of scrolling the cursor up and down, said process comprising the following steps:

displaying with the display means a selection menu identifying a plurality of different items, manipulating the navigational cross to select one of the items displayed in the selection menu by at least one of the scrolling functions, then displaying, in response to the activation of one of the complementary functionalities called first functionality of the navigational cross, a first batch of possible actions on the data in relation to the item selected in the selection menu, said process being characterized in that it also comprises the alternative step of displaying, in response to the activation of the other of said complementary functionalities said second functionality of the navigational cross, a second batch of possible actions on the data in relation to the item selected in said selection menu, said first and second functionalities each having a different specialization.

According to another particular feature, the first batch of actions groups the management functions, the first functionality being specialized for data management, while the second batch of actions groups the command functions, the second functionality being specialized for the possible commands on said data.

According to another particular feature, said first and second functionalities of the navigational cross are functionalities of movement to the left, and respectively to the right.

The invention therefore permits dividing in half all of the actions concerning an item, one part of these actions being accessible by bearing to the left on the navigational cross, another part being accessible by bearing to the right. In a classical manner, the selection of an item can be made, for example, by moving a cursor or the like (underlining, highlighting) by bearing down or up on the navigational cross.

The invention thus offers a navigation process with homogenization of actions, permitting navigating the image by simple reflex, for example, by right and left buttons of a computer mouse. The actions can be advantageously specialized, regardless of the service or application treated.

According to another particular feature, at least one pop-up window is opened on the display screen of the mobile terminal in response to the activation of the first of the complementary functionalities of the navigational cross.

According to another particular feature, at least one second pop-up window is opened on the display screen of the mobile terminal in response to the activation of the second of the complementary functionalities of the navigational cross.

According to another particular point, an action selected by said control means in one of said first and second batches is validated by manipulation of said navigational cross by activating a validation functionality for the-action selected on the display.

According to another particular feature, the first batch of actions comprises the following functions:
Consult,
Modify,
Delete,
Create contact,
Create directory,
Classify,
Voice recognition,
Back,
Exit.

According to another particular feature, the second batch of actions comprises the following functions:
Call up,
Send message,
Transfer vCard,
Locating,
Mail sending,
Back,
Exit.

According to another particular feature, said selection menu and said batches of possible actions are displayed in the form of a list or a matrix, the selection in the list or matrix being made by means of a selection cursor moved by the functionalities of upward, and, respectively, downward movement, of said navigational cross.

According to another particular feature, said possible actions are collected by category in said batches, the name of the category being displayed on the pop-up window corresponding to one batch.

According to another particular feature, the items of said selection menu correspond to applications.

According to another particular feature, the items of said selection menu correspond to general options.

According to another particular feature, the items of said selection menu correspond to states or contexts.

According to another particular feature, during navigation in said selection menu, said activation of said first functionality of the navigational cross brings about the display of a pop-up menu on a first part at least partially covering said display means, [while] said activation of said second functionality of the navigational cross brings about the display of a pop-up menu on a second part at least partially covering said display screen.

According to another particular feature, at least one item of said selection menu is connected to a branching of options and sub-options accessible by means of said navigational cross, each intermediate validation between options and sub-options leading to the display of a menu of sub-options in a pop-up window.

According to another particular feature, the pop-up window that appears on the display screen after activation of one of said complementary functions disappears from the display means in the case of consecutive activation of the other of said complementary functionalities.

Another object of the invention is to introduce a solution to one or more of the problems encountered in the prior art by defining an improved mobile terminal for the implementation of the process according to the invention.

This object is attained by a mobile wireless communication terminal for the implementation of the process according to the invention, having a user interface, said interface comprising a display means, a management system and at least one integrated control means called [a] navigational cross to move a cursor or the like over said display means by means of only one hand, said mobile terminal being characterized in that the management system comprises first control means for simultaneously displaying a plurality of selection items in the same menu called selection menu, on said display means of the mobile terminal, the navigational cross comprises functionalities permitting selecting the items from the same selection menu as well as two complementary and specialized functionalities coupled to association means, the management system comprises subdivision means for dividing the possible actions on the data into two different batches at least on the display in relation to the item selected in said selection menu, said subdivision means being coupled to association means for associating with each of the complementary and specialized functionalities of said navigational cross, after activation by the user, a corresponding batch among said batches of possible actions, the management system comprising second control means activating the association means in order to display one of the batches in a pop-up menu of the display screen.

BRIEF DESCRIPTION OF THE DRAWINGS

The invention, with its characteristics and advantages, will become more apparent upon reading the description made in reference to the attached drawings given by way of non-limiting example in which.

DETAILED DESCRIPTION OF THE PREFERRED EMBODIMENT(S)

The following description refers to the field of mobile telephony and in particular to portable telephones, but it can naturally be extended to other types of mobile terminal.

The invention will now be described in connection with FIGS. 1 and 7.

Figure 1:
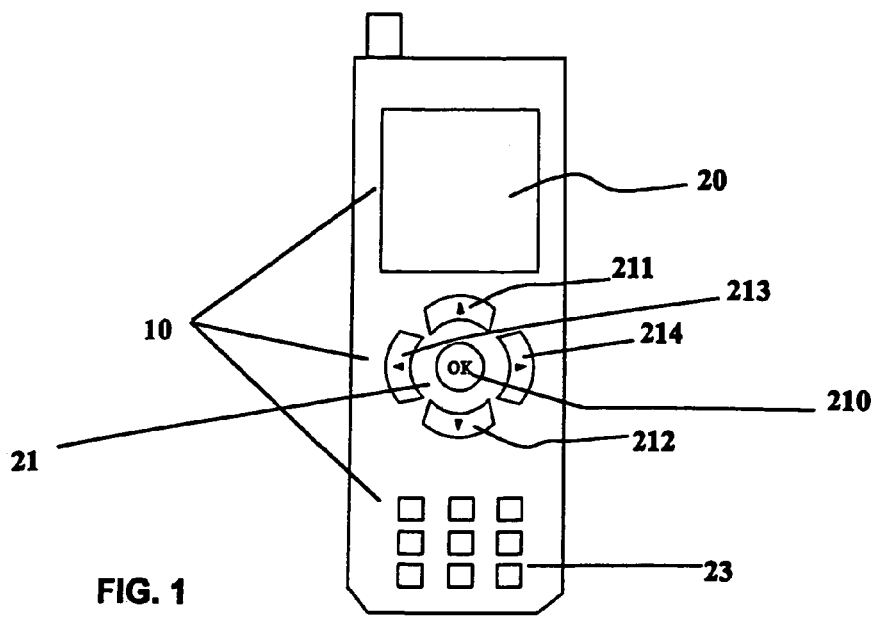
FIG. 1 represents a face view of a mobile terminal and illustrates one example of the navigational cross that can be used in the invention.

One example of a mobile terminal with which the process according to the invention can be applied is shown in FIG. 1. In this particular embodiment, the mobile terminal can be a wireless telephone endowed with a user interface (10). As illustrated in FIG. 1, user interface (10) can comprise a display means (20), a keyboard (23), a navigational cross (21) or any other navigation device permitting at least two degrees of movement, for example along the x-y axes of a coordinate system associated with the display means (20). In a non-limiting manner, in the following, we will designate as a navigational cross (21) any integrated device that permits moving a selection or item on the screen of the mobile terminal up, down, right, left, and by means of a central or offset key, validating this selection. A selection cursor, a highlighting, a frame or the like can thus be moved over said display means (20) by physical actions exerted on such a navigational cross (21).

Figure 7A:
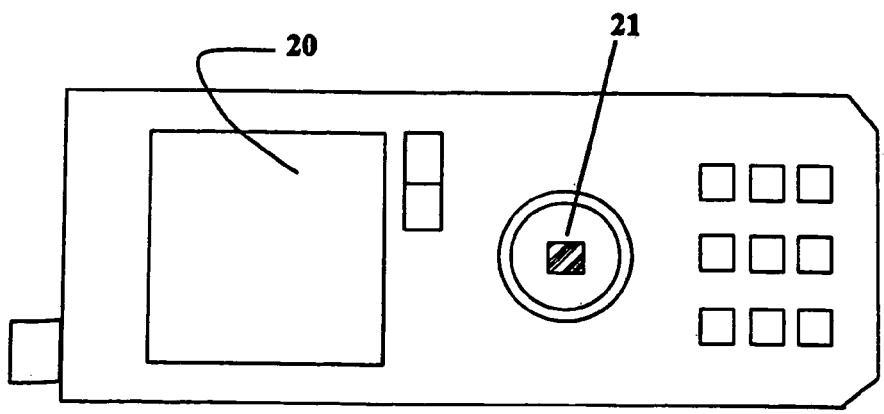
FIGS. 7a and 7b show a variant of embodiment of a mobile terminal whose navigational cross is connected to a joystick.
Figure 7B:
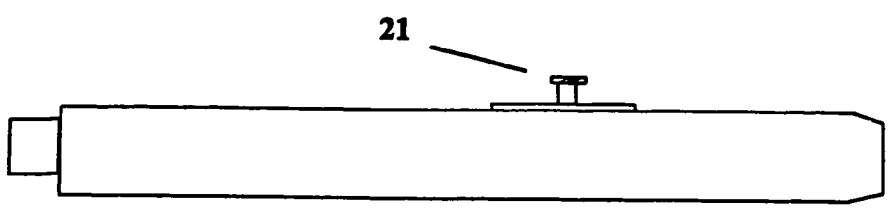

According to the embodiment in FIG. 1, navigational cross (21) has the form of buttons, for example with four scrolling keys (211, 212, 213, 214) and a separate OK key (210) for validation, situated in the center of the other 4 keys. In FIGS. 7a and 7b, the navigational cross is presented differently, in the form of a 4-direction joystick with an integrated or separate OK button. Navigational cross (21) can thus be easily manipulated by means of only one hand. In the case of a wireless telephone, user interface (10) also comprises a microphone and speaker or headset (not shown).

The invention will now be described in connection with FIGS. 1, 2, 3 and 6.

Figure 6:
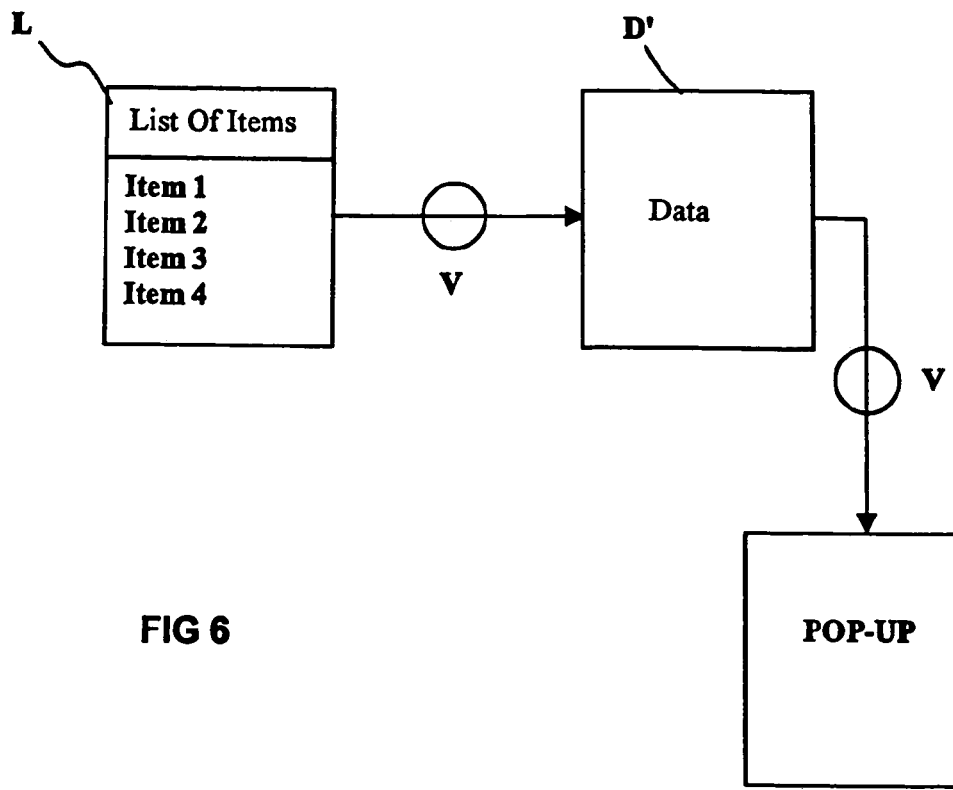
FIG. 6 shows one example of the process used in the prior art to access possible actions for an item from a selection menu.

The process according to the invention permits an optimization of the management system of a mobile terminal such as the one shown in FIG. 1. It notably gives the possibility of accessing, storing and managing data accessible to the user by means of a display means (20) such as a screen of the known type and a navigational cross (21). In the embodiments of the prior art, on the screens of a mobile terminal, data are accessible by a collection of items presented in list or matrix mode. FIG. 6 illustrates a current example of the process of the prior art by beginning with a list of items (L). According to the process shown in FIG. 6, the different actions possible on the selected item are only accessible after validation (V) and therefore display of the data (D') relative to this item. After an additional validation (V), a new pop-up window is displayed on top of the screen of the mobile terminal. By way of example, an address book is managed from the contact list. In the example of FIG. 6, the data correspond to different telephone numbers, email addresses, addresses, etc., each item of list (L) corresponding to the name or identifier of a contact.

Unlike the process shown in FIG. 6, the process according to the present invention has the significant advantage of permitting directly accessing possible actions on a list (L) item without prior display of the corresponding data. The items can be presented differently than in a list, in any ordered form whatever. In the preferred embodiment of the invention, from the collection of items of a first selection menu (1) displayed on a display means (20) of the mobile terminal, navigational cross (21) permits, with up (211) and down (212) movement functionalities, navigating (1) in list (L) of a first menu (1), with a left-movement functionality (213), accessing (11), a first sub-menu of a pop-up window (2a) of the item from first menu (1), with a right-movement functionality (214), accessing (12), a second sub-menu of a pop-up window (2b) of the item from first menu (1), with a validation (V) functionality (210), to display data relative to the item selected during navigation in list (L) of one of the menus or sub-menus.

Figure 2:
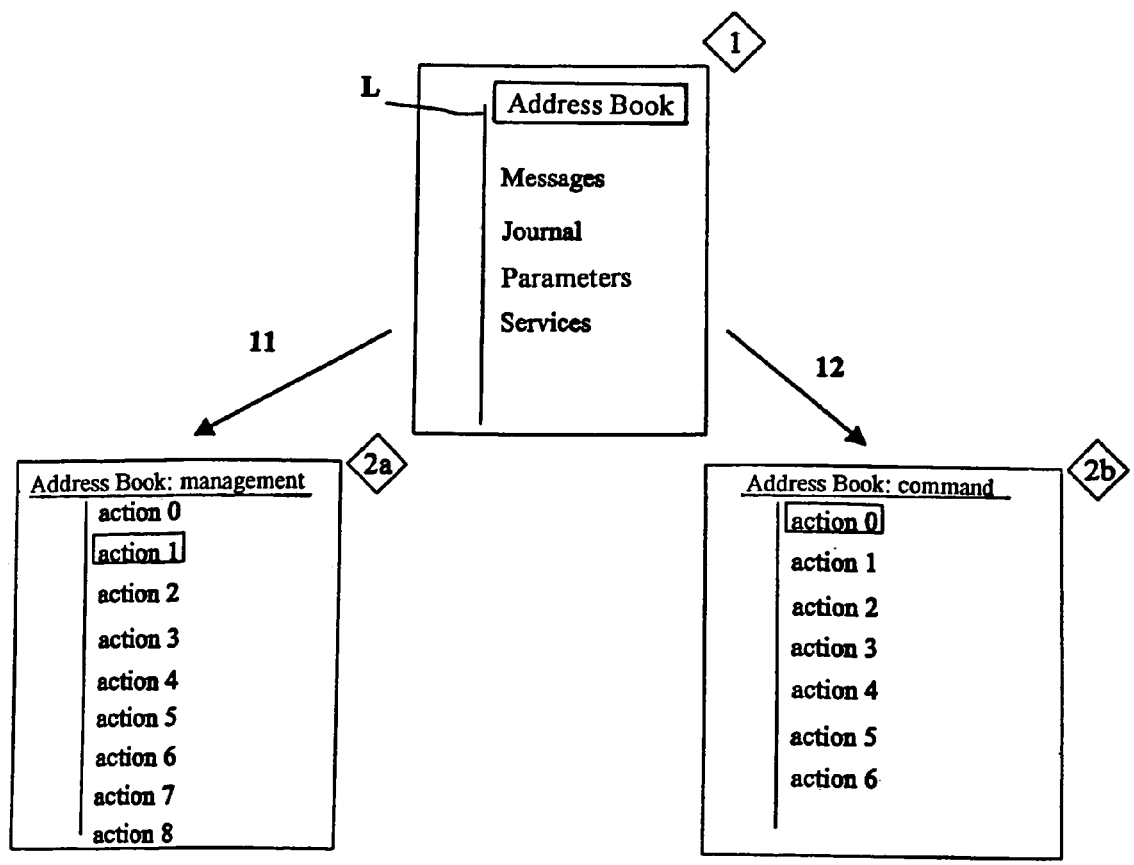
FIG. 2 shows the possible evolutions of the display screen of a mobile terminal according to the invention.
Figure 3:
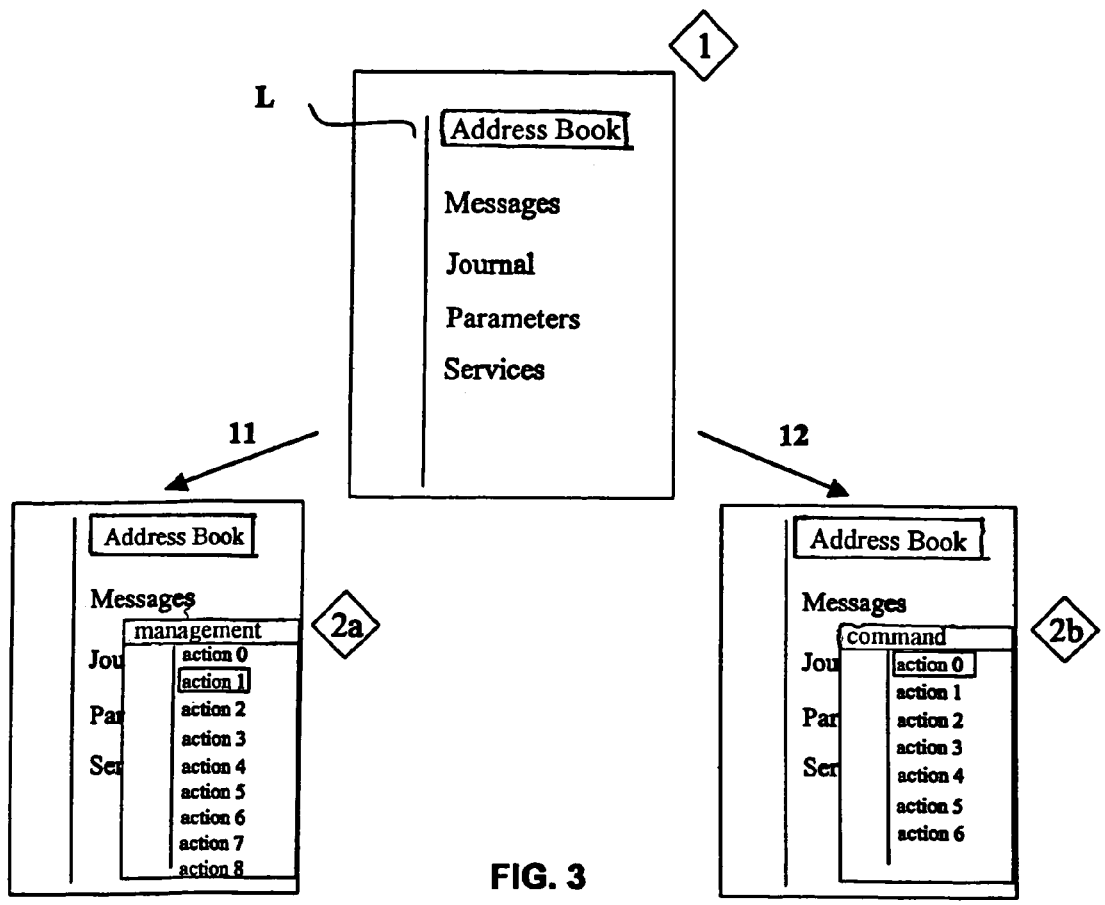
FIG. 3 shows a variant of embodiment of the evolution of the display illustrated in FIG. 2 when the new windows have a reduced format.

In different embodiments, the movement functionalities can be used in a different manner, two complementary functionalities assuring respectively access to the first pop-up sub-menu, and to the second pop-up sub-menu. Each pop-up menu can show a list or similar ordered collection of actions possible on the item selected. As shown in FIGS. 2 and 3, the mode of display on the screen of the mobile terminal of the pop-up menus is in "full-screen" or "reduced" mode, i.e., occupying the entire screen of the mobile terminal or not. In one variant of embodiment, when an item of list (L) is selected, said activation of left-movement functionality (213) of navigational cross (21) causes a pop-up window (2a) to appear, positioned on the left of display means (20). In an equivalent manner, pop-up window (2b) activated by means of right-movement functionality (214) of navigational cross (21) appears on the right of said display means (20).

In a different embodiment of the invention, several pop-up windows can be opened in response to a left or right movement carried out by means of navigational cross (21) during navigation in a list (L) of items of a selection menu (1). Several sub-menus are displayed, for example, in different stackable pop-up windows distributed superimposed over display means (20) of the mobile terminal.

Figure 4:
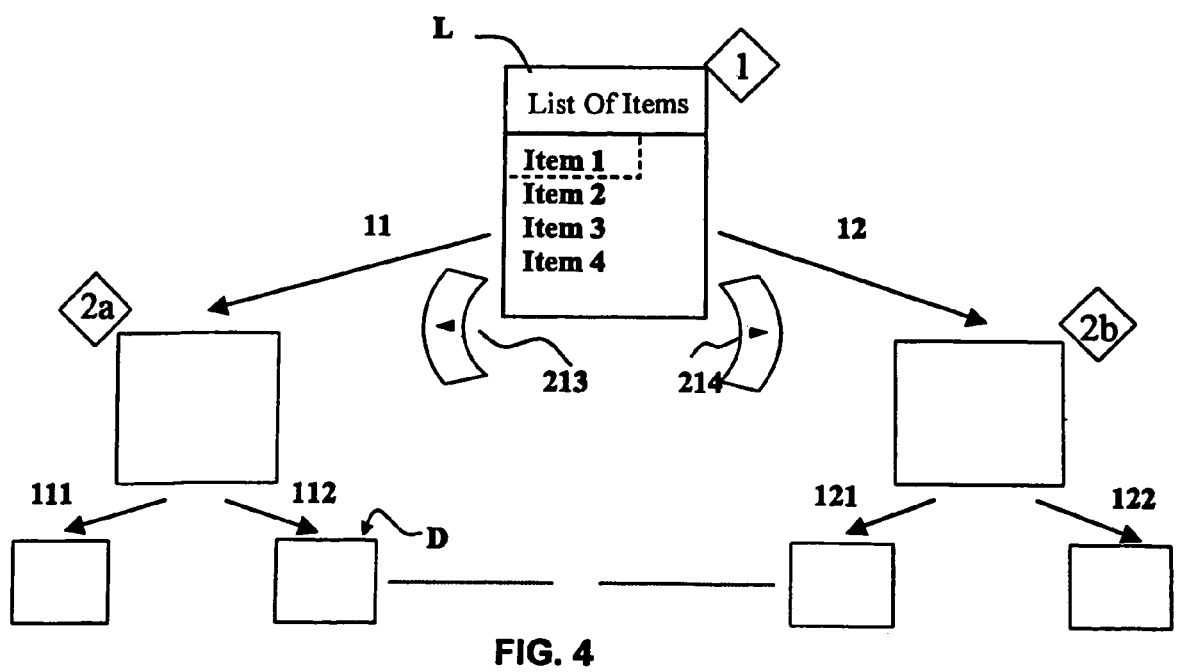
FIG. 4 schematically shows examples of logical progression of display screens in one embodiment of the process according to the invention.

In the embodiment of FIGS. 3 and 4, the item "address book" displayed in a selection menu (1) is selected by means of navigational cross (21), for example, with up (211) and down (212) keys of the terminal illustrated in FIG. 1. A first menu, associated with the address book, is displayed in a first pop-up window (2a) in response to pressing left key (213) of navigational cross (21). A second menu, also associated with the address book, is displayed in a second pop-up window (2b) in response to pressing right key (214) of the navigational cross (21). The first menu can, for example, group all the actions intended for data management functions while the second menu can, for example, group all the possible command functions on the data of the address book. In the illustrative and non-limiting case of address-book management, as illustrated in FIGS. 2 and 3, the management system of said book is divided into two subdivisions. In the first menu of said first pop-up window (2a), corresponding to data-management, the following actions are found 0. Consult,
1. Modify,
2. Delete,
3. Create contact,
4. Create directory,
5. Classify,
6. Voice recognition,
7. Back,
8. Exit.

These actions, numbered 1 to 8 in FIGS. 2 and 3, can be management actions, for example. In the second menu of said second pop-up window (2b), corresponding to commands on the data, the following actions are found, for example 0. Call up,
1. Send message,
2. Transfer vCard,
3. Locating,
4. Mail sending,
5. Back,
6. Exit.

Said possible actions are thus collected in a batch of actions by category, and the name of the category can be displayed on the corresponding pop-up window. Thus, by simple left or right click, the invention permits access to such pop-up windows (2a, 2b) corresponding to specialized sub-menus in which actions are made uniform. The left (213) and right (214) keys can also be specialized according to the logic of FIGS. 2 and 3, for example, regardless of the service or application treated.

The invention will now be described in connection with FIGS. 4 and 5 and 6.

As illustrated in FIG. 4, the process according to the invention consists of first displaying, with said display means, a selection menu (1) identifying a plurality of different items in a list (L) or the like, then to state in an optimized and uniform manner several options in relation to the item selected. After having positioned the cursor or the like on an item of list (L), the user can easily manipulate the left (213) and right (214) functionalities of navigational cross (21) to access (11, 12) windows (2a, 2b) with pop-up menu. The options of these pop-up menus can then be validated to access (111, 112, 121, 122) data (D) specific to the validated option. In contrast to data (D') generally presented in the form of a scattered group, the data accessed by means of the process according to the invention precisely correspond to the action that the user wishes to carry out.

In one embodiment of the invention, the items of said selection menu (1) correspond to general applications and/or options. They can also correspond to states or contexts. The process according to the invention can advantageously be applied to any type of recorded data, to regulation parameters, to configuration options, to a list of general/specific functionalities, etc. Moreover, it is possible to easily and effectively create an action tree, and each intermediate action can correspond to the display of a pop-up window. Thus, one or more items of said selection menu (1) can be coupled with a branching of options and sub-options accessible by means of said navigational cross (21), each intermediate validation between options and sub-options leading to the display of a menu of sub-options in a pop-up window.

Figure 5:
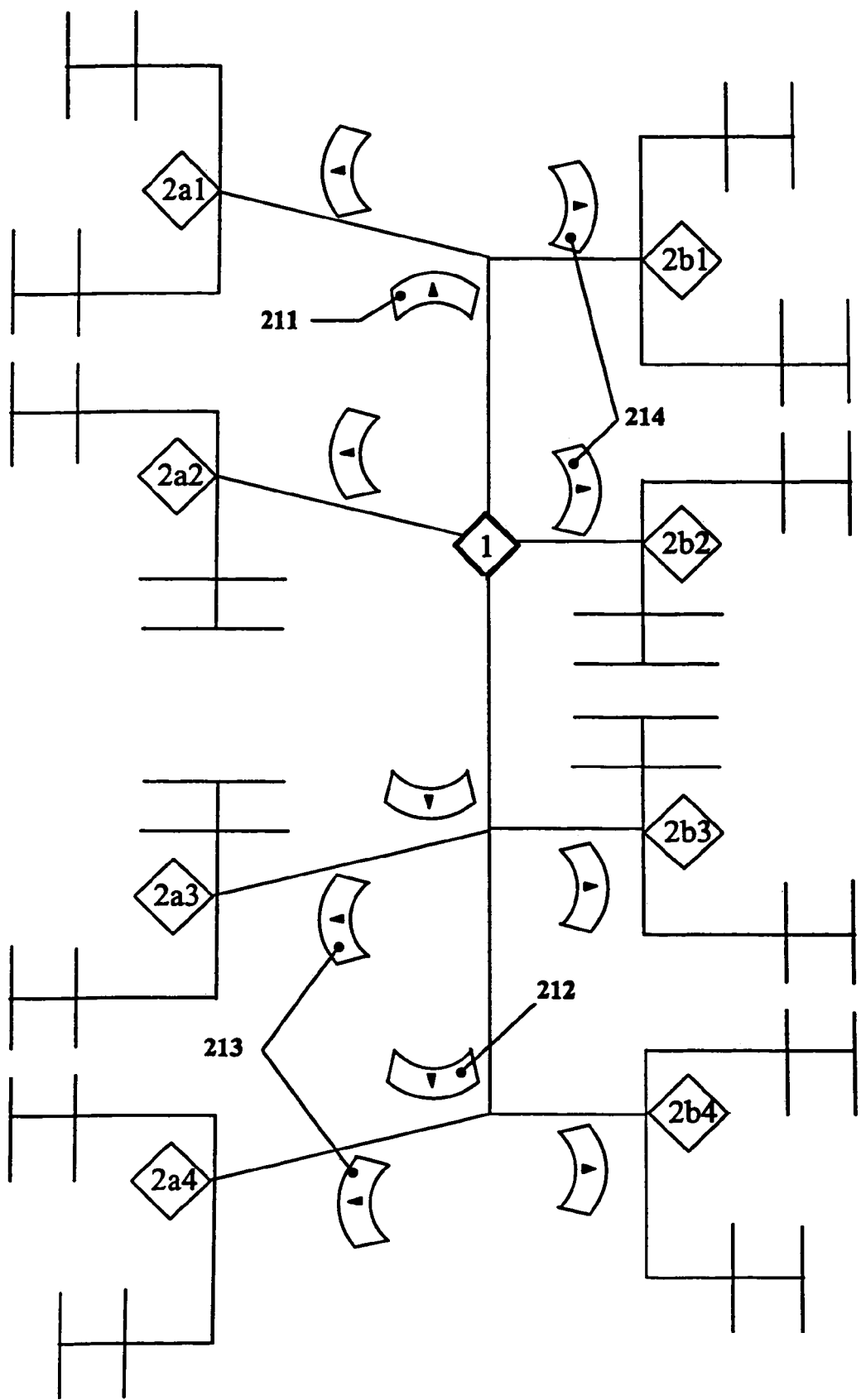
FIG. 5 schematically shows one example of tree structure that can be created by means of the process implemented in the invention.

FIG. 5 shows one example of tree structure that can be created with the process of the invention. From a selection menu (1) displaying four items, for example, eight sub-menus can be obtained in different pop-up windows (2a1, 2b1, 2a2, 2b2, 2a3, 2b3, 2a4, 2b4). In the example of FIG. 5, each of the sub-options accessible in the sub-menus is itself divided into eight other sub-menus of lesser degree that can be accessed in a similar manner, by means of navigational cross (21). The branching generated by the process according to the invention permits the user to save time to act on the data or to make use of the data that he needs, without requiring a display of all of the other data.

In one embodiment of the invention, the display management program is provided so that the pop-up window that has just appeared on display means (20), after activation of one of the complementary left (213) or right (214) functionalities of navigational cross (21) disappears from display means (20) in the case of consecutive activation of the other of said complementary functionalities (213, 214). Thus, in the example of FIG. 5, navigation is completely reversible.

The mobile terminal for implementing the process according to the invention comprises a management system endowed with a first control means for simultaneously displaying a plurality of selection items in the same selection menu (1) on said display means (20) of said mobile terminal. This management system also has subdivision means for dividing into two different sub-menus possible actions on the data in relation to the item selected in selection menu (1). The subdivision means of said management system comprise association means coupled with navigational cross (21), notably coupled with the complementary functionalities (213, 214) of navigational cross (21) activating pop-up windows (2a, 2b). These association means permit associating each of said complementary functionalities (213, 214) of navigational cross (21) to a corresponding sub-menu among said sub-menus of possible actions. The sub-menus can also be sub-groups of actions displayed in any ordered form whatever.

The management system also has second control-means activating said association means in order to display one of said sub-menus in a pop-up window on display means (20). The management system of the mobile terminal therefore permits, in one embodiment of the invention, generating a pop-up window on a display screen representing a sub-menu associated both with the item of selection menu (1) designated by the cursor and by the left (213) or right (214) navigation key that the user has then pressed.

One of the advantages of the invention when compared with the existing technology is that it permits subdividing the accessible options, thus reducing the contents of sub-menus, often too full of functionalities, options, etc.

Another of the advantages of the process according to the invention is the simplicity of access to tasks, uses, data manipulations, without requiring the display of numerous data for which the user has no immediate interest.

It should be clear to persons skilled in the art that the present invention permits embodiments in numerous other specific forms without deviating from the field of application of the invention as claimed. Consequently, the present embodiments must be considered by way of illustration, but can be modified within the field defined by the scope of the attached claims, and the invention must not be limited to the details given above.

What is claimed is:

1. A process for optimized navigation in display menus of a mobile wireless communication terminal, in which the mobile terminal is endowed with a user interface that comprises a display means and at least one integrated control means called a navigational cross in order to move by physical actions on the cross a cursor over the display means, said navigational cross having two functionalities complementary to the functionalities of scrolling the cursor up and down, the process comprising:

displaying with the display means a selection menu identifying a plurality of different items, manipulating the navigational cross to select, by at least one of the scrolling functionalities, one of the items displayed in the selection menu, then displaying in response to activation of one of the complementary functionalities called a first functionality of navigational cross, a first batch of possible actions on a data in relation to the item selected in selection menu, said process being characterized in that it also comprises an alternative step of displaying, in response to the activation of the other of said complementary functionalities called a second functionality of navigational cross, a second batch of possible actions on the data in relation to the selected item in said selection menu, said first and second functionalities each having a different specialization;

in which the first batch of actions groups management functions, the first functionality being specialized for data management, while the second batch of actions groups command functions, the second functionality being specialized for possible commands on said data.

2. The process according to claim 1, in which said first and second functionalities of navigational cross are functionalities for movement to the left and respectively, to the right.

3. The process according to claim 1, in which at least one first pop-up window is opened on display means of the mobile terminal in response to activation of the first of complementary functionalities of navigational cross.

4. The process according to claim 3, in which at least one second pop-up window is opened on display means of the mobile terminal in response to activation of the second of complementary functionalities of navigational cross.

5. The process according to claim 1, in which an action selected by said control means in one of said first and second batches is validated by manipulation of said navigational cross by activating a validation functionality for the action selected on the display.

6. The process according to claim 1, in which the first batch of actions comprises the following functions
Consult,
Modify,
Delete,
Create contact,
Create directory,
Classify,
Voice recognition,
Back,
Exit.

7. The process according to claim 1, in which the second batch of actions comprises the following functions
Call up,
Send message,
Transfer vCard,
Locating,
Mail sending,
Back,
Exit.

8. The process according to claim 1, in which a selection menu and said batches of possible actions are displayed in the form of a list or a matrix, the selection in the list or the matrix being effected by means of a selection cursor moved by upward, and respectively, downward movement functionalities, of said navigational cross.

9. The process according to claim 5, in which said possible actions are grouped by category in said batches, the name of the category being displayed on the pop-up window corresponding to one batch.

10. The process according to claim 1, in which said items of said selection menu correspond to applications.

11. The process according to claim 1, in which the items of said selection menu correspond to general options.

12. The process according to claim 1, in which the items of said selection menu correspond to states or contexts.

13. The process according to claim 1, in which, during navigation in said selection menu, said activation of said first functionality of navigational cross brings about the display of a pop-up menu on a first part at least partially covering said display means, said activation of said second functionality of navigational cross brings about the display of a pop-up menu on a second part at least partially covering said display means.

14. The process according to claim 1, in which at least one item of said selection menu is coupled to a branching of options and sub-options accessible by means of said navigational cross, each intermediate validation between options and sub-options leading to the display of a menu of sub-options in a pop-up window.

15. The process according to claim 3, in which pop-up window which has just appeared on the display means after the activation of one of said complementary functionalities disappears from display means in the case of the consecutive activation of the other of said complementary functionalities.

16. A mobile wireless communication terminal for implementation of the process according to claim 1, having the user interface, said interface comprising the display means, a management system and at least one said integrated control means called the navigational cross to move the cursor over said display means by means of only one hand, said mobile terminal being characterized in that: the management system comprises a first control means for simultaneously displaying a plurality of selection items in a same menu called the selection menu on said display means of the mobile terminal, the navigational cross comprises functionalities permitting selecting the items of the same selection menu as well as two complementary and specialized functionalities coupled to an association means, the management system comprises a subdivision means for dividing the possible actions on the data into two different batches at least by the display means in relation to the item selected in said selection menu, said subdivision means being coupled to the association means for associating each of said complementary and specialized functionalities of the navigational cross, after activation by the user, to a corresponding batch among said batches of possible actions, the management system comprising a second control means for activating the association means in order to display one of the batches in a pop-up menu on the display means.

* * * * *